United States Patent
Chang et al.

(10) Patent No.: US 12,221,304 B2
(45) Date of Patent: Feb. 11, 2025

(54) SHEET DETECTION DEVICE AND DETECTION METHOD THEREOF

(71) Applicant: KINPO ELECTRONICS, INC., New Taipei (TW)

(72) Inventors: Tzu-Cheng Chang, New Taipei (TW); Wei-Chun Jau, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 132 days.

(21) Appl. No.: 18/076,249

(22) Filed: Dec. 6, 2022

(65) Prior Publication Data
US 2024/0140742 A1    May 2, 2024

(30) Foreign Application Priority Data
Oct. 27, 2022   (CN) ......................... 202211326649.3

(51) Int. Cl.
*B65H 1/04*    (2006.01)
*B65H 1/26*    (2006.01)
(Continued)

(52) U.S. Cl.
CPC ............... *B65H 1/04* (2013.01); *B65H 1/266* (2013.01); *B65H 43/00* (2013.01); *G01B 7/02* (2013.01);
(Continued)

(58) Field of Classification Search
CPC ............ B65H 2511/12; B65H 2511/11; B65H 2511/10; B65H 1/04; B65H 1/266; B65H 2553/22
See application file for complete search history.

(56) References Cited

U.S. PATENT DOCUMENTS

| | | | | |
|---|---|---|---|---|
| 4,579,333 A | * | 4/1986 | Aoki | G03G 15/04 271/171 |
| 4,698,996 A | * | 10/1987 | Kreft | G01B 7/003 73/1.79 |

(Continued)

FOREIGN PATENT DOCUMENTS

| | | |
|---|---|---|
| JP | S63132747 U | 8/1988 |
| JP | 2007302443 A | 11/2007 |
| TW | 201402343 A | 1/2014 |

OTHER PUBLICATIONS

Office Action dated Feb. 20, 2024 of the corresponding Japan patent application No. 2023-000962.

*Primary Examiner* — Luis A Gonzalez
(74) *Attorney, Agent, or Firm* — Chun-Ming Shih; HDLS IPR SERVICES

(57) ABSTRACT

A detecting method of a sheet detection device includes: generating, by a first magnetic sensing element, a first voltage signal corresponding to a magnetic element; generating, by a second magnetic sensing element, a second voltage signal corresponding to the magnetic element; determining, by a processing element, a first relative position of the magnetic element relative to the first magnetic sensing element according to the first voltage signal; determining, by the processing element, a second relative position of the magnetic element relative to the second magnetic sensing element according to the second voltage signal; determining, by the processing element, a stopping position of the magnetic element according to the first relative position and the second relative position; determining, by the processing element, a paper size of a paper abutted by a paper guide according to the stopping position. A sheet detection device is also disclosed.

4 Claims, 13 Drawing Sheets

(51) Int. Cl.
*B65H 43/00* (2006.01)
*G01B 7/02* (2006.01)

(52) U.S. Cl.
CPC ...... *B65H 2511/12* (2013.01); *B65H 2553/22* (2013.01)

(56) References Cited

U.S. PATENT DOCUMENTS

| | | | |
|---|---|---|---|
| 8,807,557 B2 * | 8/2014 | Lu .......................... | B65H 1/00 271/171 |
| 2023/0001717 A1 * | 1/2023 | Yang ....................... | B65H 1/06 |

* cited by examiner

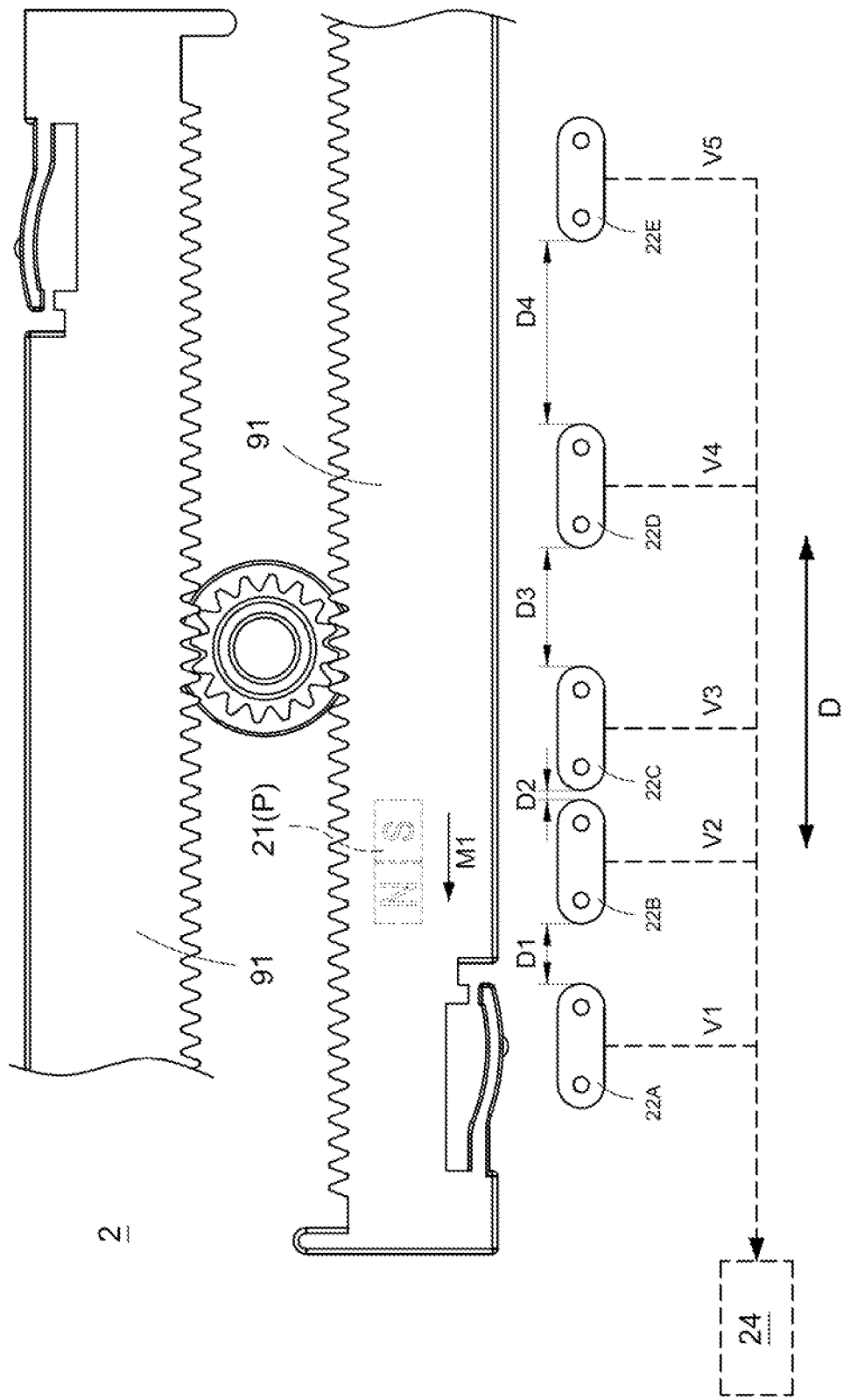

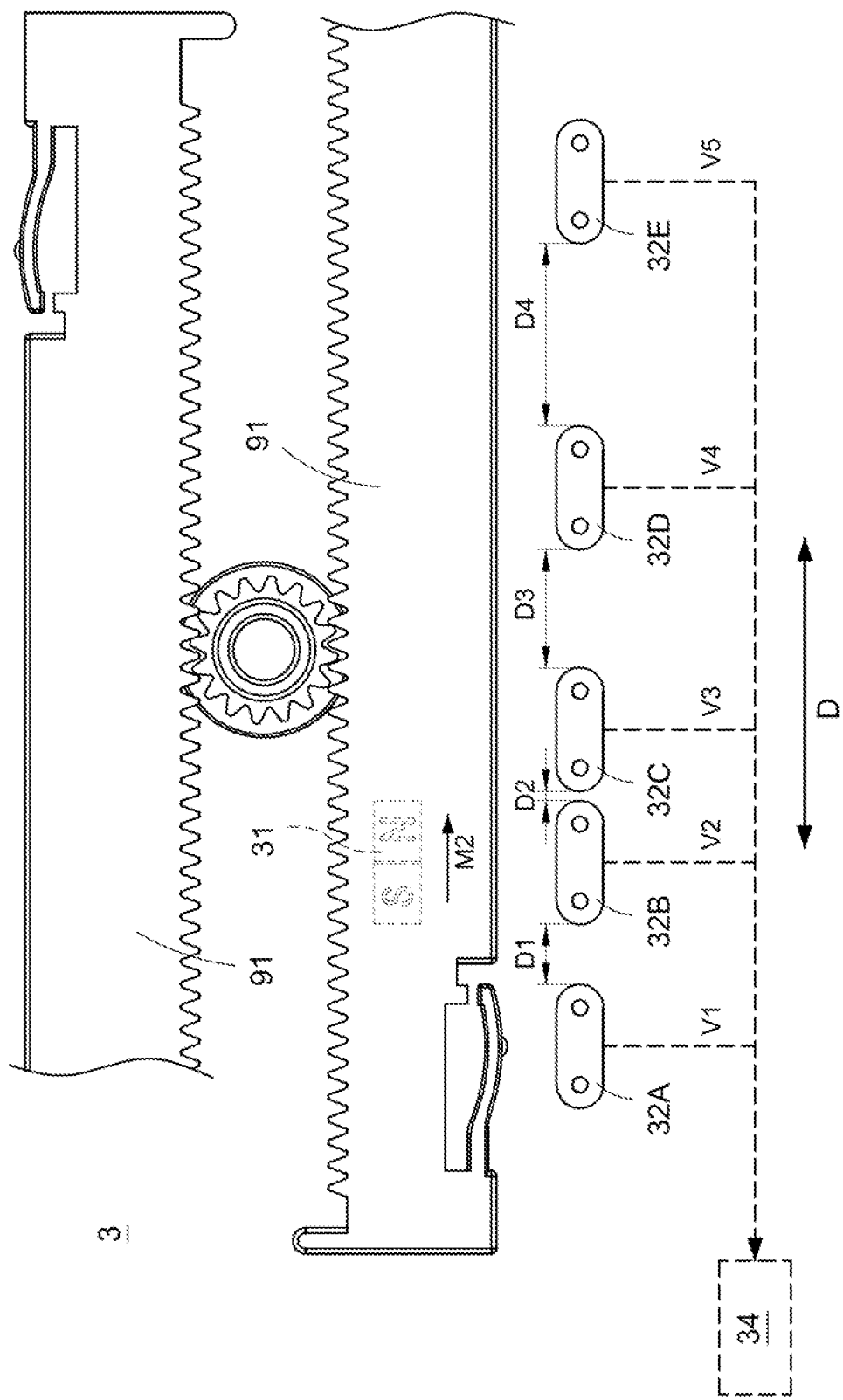

SHEET DETECTION DEVICE AND DETECTION METHOD THEREOF

BACKGROUND OF THE DISCLOSURE

Technical Field

The disclosure relates to a detection device, particularly relates to a sheet detection device and a detection method thereof.

Description of Related Art

In the related-art sheet detection mechanism, the main structure includes an input tray and an optical scale sensing module. Further, the optical sensor may be disposed on the paper guide, and the optical sensor is being moved to the required location by the movement of the paper guide. Therefore, the width size of the sheet may be obtained from the position read by the optical sensor.

On the other hand, in the Taiwanese invention publication No. TW 201402343A, the sheet detection mechanism of the printer includes a paper tray, a width regulator, a length regulator, and a logic unit. The width regulator and the length regulator are disposed on the front surface of the bottom plate in the paper tray. A sheet-putting area is collectively formed by the width regulator, the length regulator, and the bottom plate. The sheet detection mechanism further includes a first magnetic element disposed on the width regulator, a second magnetic element disposed on the length regulator, and multiple magnetic sensing elements disposed on the back surface of the bottom plate. Each magnetic sensing element generates a position signal when sensing the first magnetic element or the second magnetic element. The logic unit determines the sheet size in the sheet-putting area according to the position signal combinations generated by the magnetic sensing elements.

However, in the design concept of the related arts, the optical sensor or the magnetic sensing element are all structured by detecting "YES" or "NO" signal. Therefore, when the paper guide or the regulator slightly shifts from the position of predetermined sheet size, the optical sensor or the magnetic sensing element may still generate signal, but the signal strength may not be corresponding to the predetermined strength. As a result, that may cause erroneous signal determination, and further cause erroneous sheet-size determination.

In view of this, the inventors have devoted themselves to the aforementioned related art, researched intensively try to solve the aforementioned problems.

SUMMARY OF THE DISCLOSURE

The purpose of the disclosure is to provide a sheet detection device and a detection method thereof for precisely detecting the sheet size.

The disclosure provides a detection method of a sheet detection device. The sheet detection device is incorporated with a paper tray. The paper tray includes a paper guide. The sheet detection device includes a magnetic element disposed on the paper guide, a first magnetic sensing element and a second magnetic sensing element disposed in the paper tray, and a processing element electrically connected with the first magnetic sensing element and the second magnetic sensing element. The detection method includes: the first magnetic sensing element generating a first voltage signal corresponding to the magnetic element; the second magnetic sensing element generating a second voltage signal corresponding to the magnetic element; the processing element determining a first relative position of the magnetic element relative to the first magnetic sensing element according to the first voltage signal; the processing element determining a second relative position of the magnetic element relative to the second magnetic sensing element according to the second voltage signal; the processing element determining a stopping position of the magnetic element according to the first relative position and the second relative position; and the processing element determining a sheet size of a paper abutted by the paper guide according to the stopping position.

In some embodiments, the detection method further includes: when the first voltage signal is corresponding to a predetermined voltage signal, the processing element determining the first relative position to be that the magnetic element is located at the first magnetic sensing element, and determining the second relative position to be that the magnetic element is located at one side of the second magnetic sensing element adjacent to the first magnetic sensing element.

In some embodiments, the detection method further includes: the processing element determining the stopping position to be that the magnetic element is located at the first magnetic sensing element according to the first relative position and the second relative position.

In some embodiments, the detection method further includes: when the first voltage signal is in corresponding to the predetermined voltage signal and the second voltage signal is corresponding to the predetermined voltage, the processing element determining the first relative position to be that the magnetic element is located at one side of the first magnetic sensing element adjacent to the second magnetic sensing element, and determining the second relative position to be that the magnetic element is located at the second magnetic sensing element.

In some embodiments, the detection method further includes: the processing element determining the stopping position to be that the magnetic element is located at the second magnetic sensing element according to the first relative position and the second relative position.

In some embodiments, the processing element determining the first relative position according to the first voltage signal further includes: the processing element determining the first relative position to be that the magnetic element is located at one side of the first magnetic sensing element adjacent to the second magnetic sensing element.

In some embodiments, the processing element determining the second relative position according to the second voltage signal further includes: the processing element determining the second relative position to be that the magnetic element is located at one side of the second magnetic sensing element adjacent to the first magnetic sensing element.

In some embodiments, the processing element determining the stopping position according to the first relative position and the second relative position further includes: the processing element determining the stopping position to be that the magnetic element is located between the first magnetic sensing element and the second magnetic sensing element.

The disclosure provides a sheet detection device incorporated with a paper tray. The paper tray includes a paper guide. The sheet detection device includes: a magnetic element, disposed on the paper guide; a first magnetic sensing element, disposed on the paper tray and configured to generate a first voltage signal corresponding to the magnetic element; a second magnetic sensing element, disposed on the paper tray, arranged spacedly with the first magnetic sensing element, and configured to generate a second voltage signal corresponding to the magnetic element; and a processing element, electrically connected with the first magnetic sensing element and the second magnetic sensing element, and configured to receive the first voltage signal and the second voltage signal. The processing element is configured to determine a first relative position of the magnetic element relative to the first magnetic sensing element according to the first voltage signal, and determine a second relative position of the magnetic element relative to the second magnetic sensing element according to the second voltage signal. The processing element is configured to determine a stopping position of the magnetic element according to the first relative position and the second relative position, and determine a sheet size of a paper abutted by the paper guide according to the stopping position.

In some embodiments, when the first voltage signal is corresponding to a predetermined voltage signal, the processing element is configured to determine the first relative position to be that the magnetic element is located at the first magnetic sensing element, and determine the second relative position to be that the magnetic element is located at one side of the second magnetic sensing element adjacent to the first magnetic sensing element. The processing element is configured to determine the stopping position to be that the magnetic element is located at the first magnetic sensing element according to the first relative position and the second relative position.

In some embodiments, the sheet detection device further includes: a third magnetic sensing element, disposed on the paper tray, arranged spacedly with the second magnetic sensing element, and the second magnetic sensing element located between the first magnetic sensing element and the third magnetic sensing element. A first spacing between the first magnetic sensing element and the second magnetic sensing element is different from a second spacing between the second magnetic sensing element and the third magnetic sensing element.

In some embodiments, the third magnetic sensing element is configured to generate a third voltage signal corresponding to the magnetic element. The processing element is configured to determine a third relative position of the magnetic element relative to the third magnetic sensing element according to the third voltage signal, and determine the stopping position of the magnetic element according to the first relative position, the second relative position, and the third relative position.

In some embodiments, when the second voltage signal is corresponding to the predetermined voltage signal, the processing element is configured to determine the first relative position to be that the magnetic element is located at one side of the first magnetic sensing element adjacent to the second magnetic sensing element, determine the second relative position to be that the magnetic element is located at the second magnetic sensing element, and determine the third relative position to be that the magnetic element is located at one side of the third magnetic sensing element adjacent to the second magnetic sensing element. The processing element is configured to determine the stopping position to be that the magnetic element is located at the second magnetic sensing element.

In some embodiments, the sheet detection device further includes: a third magnetic sensing element, disposed on the paper tray, arranged spacedly with the second magnetic sensing element, and the second magnetic sensing element located between the first magnetic sensing element and the third magnetic sensing element. A first spacing between the first magnetic sensing element and the second magnetic sensing element is same with a second spacing between the second magnetic sensing element and the third magnetic sensing element.

In some embodiments, the third magnetic sensing element is configured to generate a third voltage signal corresponding to the magnetic element. The processing element is configured to determine a third relative position of the magnetic element relative to the third magnetic sensing element according to the third voltage signal, and determine the stopping position of the magnetic element according to the first relative position, the second relative position, and the third relative position.

In some embodiments, the processing element is configured to determine the first relative position to be that the magnetic element is located at one side of the first magnetic sensing element adjacent to the second magnetic sensing element, determine the second relative position to be that the magnetic element is located at one side of the second magnetic sensing element adjacent to the first magnetic sensing element, and determine the third relative position to be that the magnetic element is located at one side of the third magnetic sensing element adjacent to the second magnetic sensing element. The processing element is configured to determine the stopping position to be that the magnetic element is located between the first magnetic sensing element and the second magnetic sensing element.

The disclosure provides a sheet detection device incorporated with a paper tray. The paper tray includes a paper guide. The sheet detection device includes: a magnetic element, disposed on the paper guide; a plurality of magnetic sensing elements, disposed spacedly on the paper tray, each magnetic sensing element configured to generate a voltage signal corresponding to the magnetic element, and a number of the magnetic sensing elements corresponding to a number of a predetermined sheet type; and a processing element, electrically connected with the magnetic sensing elements. The processing element is configured to determine a plurality of relative positions of the magnetic element relative to the magnetic sensing elements according to a plurality of voltage signals generated by the magnetic sensing elements. The processing element is configured to determine a stopping position of the magnetic element according to the relative positions, and determine a sheet size of a paper abutted by the paper guide according to the stopping position.

In some embodiments, when the voltage signal of one of the magnetic sensing elements is corresponding to a predetermined voltage signal, the processing element is configured to determine one of the relative positions to be that the magnetic element is located at the one of the magnetic sensing elements.

In some embodiments, when the voltage signal of the one of the magnetic sensing elements is corresponding to a predetermined voltage signal, the voltage signal of another one of the magnetic sensing elements adjacent to the one of the magnetic sensing elements is different from the predetermined voltage signal.

In some embodiments, the processing element is configured to determine another one of the relative positions to be that the magnetic element is located at one side of the another one of the magnetic sensing elements adjacent to the one of the magnetic sensing elements.

In summary, the sheet detection device and the detection method thereof of the disclosure have at least two magnetic sensing elements disposed at different positions, and the magnetic sensing elements generate different voltage signals corresponding to the magnetic element, respectively. Therefore, when the paper guide moves to different positions with the magnetic element and different magnetic sensing elements generate different voltage signals corresponding to the magnetic element, the processing element may be configured to determine the relative positions of the magnetic element with respect to the magnetic sensing elements according to the voltage signals, and further to precisely determine the position of the paper guide with the magnetic element. Comparing to the related art, which is solely structured by detecting "YES" or "NO" signal, in the sheet detection device and the detection method thereof of the disclosure, when the magnetic element is located at any position, the processing element is configured to determine the relative position of the magnetic element according to the voltage signals generated by the magnetic sensing elements. As a result, the erroneous signal determination may be avoided, and the size of the sheet abutted by the paper guide may be precisely determined.

BRIEF DESCRIPTION OF THE DRAWINGS

FIG. 8A is a schematic diagram of a using state of the sheet detection device, in accordance with the second embodiment of the disclosure.

FIG. 9A is a schematic diagram of a using state of the sheet detection device, in accordance with the third embodiment of the disclosure.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
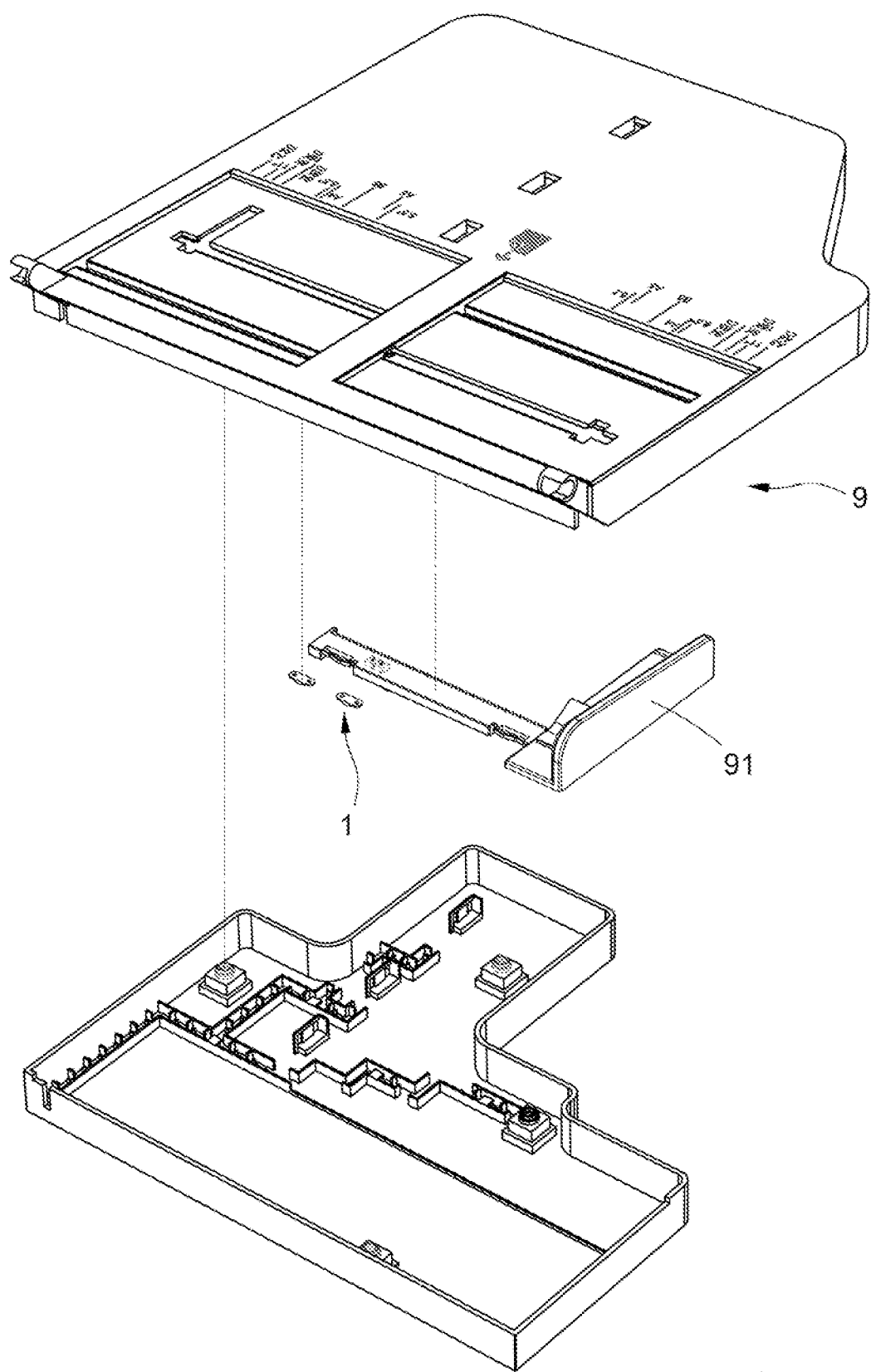
FIG. 1 is a schematic diagram of a sheet detection device incorporated with a paper tray, in accordance with the first embodiment of the disclosure.
Figure 2:
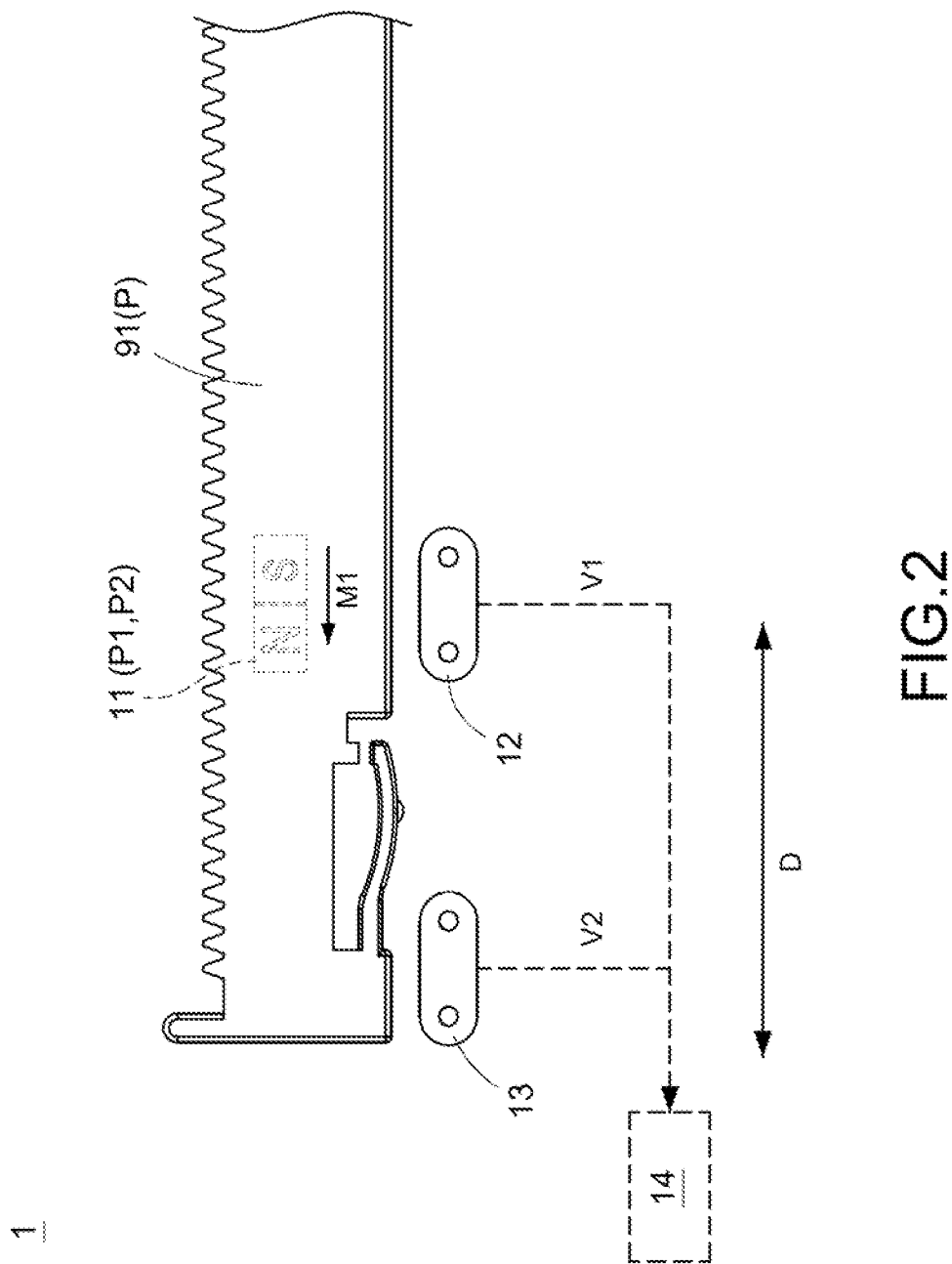
FIG. 2 is a schematic diagram of a using state of the sheet detection device, in accordance with the first embodiment of the disclosure.

FIG. 1 is a schematic diagram of a sheet detection device incorporated with a paper tray, in accordance with the first embodiment of the disclosure. FIG. 2 is a schematic diagram of a using state of the sheet detection device, in accordance with the first embodiment of the disclosure.

Figure 7:
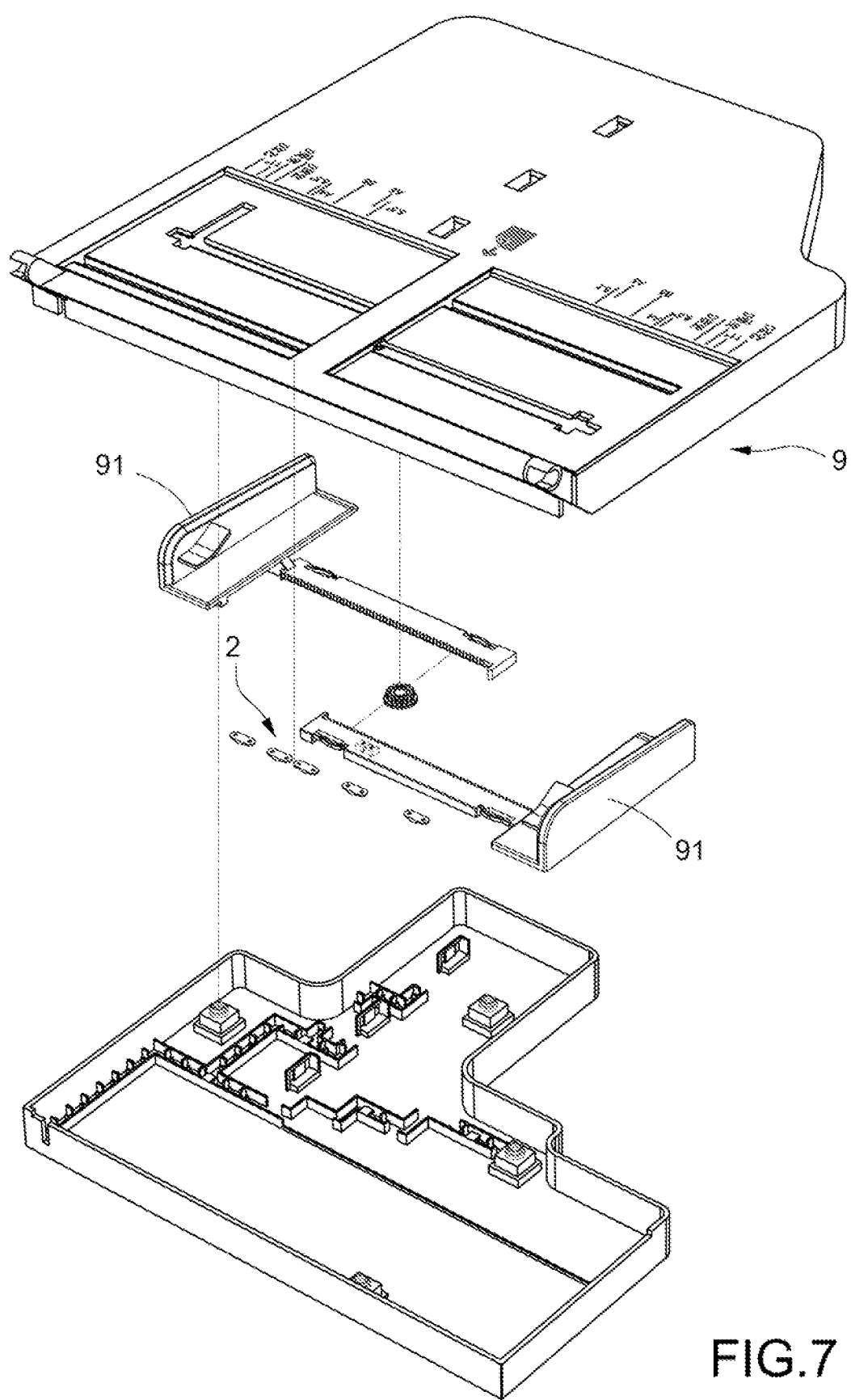
FIG. 7 is a schematic diagram of a sheet detection device incorporated with a paper tray, in accordance with the second embodiment of the disclosure.

Referring to FIG. 1 and FIG. 2, the sheet detection device 1 of the disclosure, for example, may be incorporated with the paper tray 9 of the printer (not shown in figures). The paper tray 9 may include a paper guide 91. The paper guide 91 is disposed in the paper tray 9 and capable of moving along a moving direction D. It should be noted that the paper guide 91 may be a single side (such as left side, right side or bottom side) paper guide (as shown in FIG. 1), left side and right side linked paper guide (as shown in FIG. 7 below), or left side (or right side) and bottom side linked paper guide (not shown in figures), or the other paper guides of linked or non-linked in different manners, here is not intended to be limiting. The aforementioned left side, right side or bottom side are described with respect to the side of the paper tray 9 connected to the sheet inlet of the printer as the upper side.

The sheet detection device 1 includes a magnetic element 11, a first magnetic sensing element 12, a second magnetic sensing element 13, and a processing element 14.

The magnetic element 11 is disposed on the paper guide 91. The magnetic element 11 may be, for example, magnet, and the magnetic intensity (or magnetic force) of the magnetic element 11 is not limiting. When the paper guide 91 moves along the moving direction D, the paper guide 91 brings the magnetic element 11 to move together. Moreover, the arrangement of the direction M1 of the magnetic moment (the direction from south pole S to north pole N of the magnet) is not limiting. Here uses that the direction M1 of the magnetic moment is the same with the moving direction D of the paper guide 91 away from the side wall of the paper tray 9 (that is, the moving direction D toward left in FIG. 2) as an example.

The first magnetic sensing element 12 is disposed on the paper tray 9 and configured to generate a first voltage signal V1 corresponding to the magnetic element 11. The first magnetic sensing element 12 may be, for example, a Hall sensor, here is not intended to be limiting.

The second magnetic sensing element 13 is disposed on the paper tray 9 and arranged spacedly with the first magnetic sensing element 12. The second magnetic sensing element 13 is configured to generate a second voltage signal V2 corresponding to the magnetic element 11. The second magnetic sensing element 13 may be, for example, a Hall sensor, here is not intended to be limiting. The second magnetic sensing element 13 may be a magnetic sensing element with the same or different specifications of the first magnetic sensing element 12, here is not intended to be limiting. In the embodiment, the first magnetic sensing element 12 and the second magnetic sensing element 13 are using the magnetic sensing elements with the same specifications as an example.

In some embodiments, the first magnetic sensing element 12 and the second magnetic sensing element 13 may be located at a side of the magnetic element 11 (as shown in FIG. 2), or located at a bottom side of the magnetic element (not shown in figures, that is, the magnetic sensing element is overlapped with the paper guide 91 in top view), here is not intended to be limiting. The main requirement is that the first magnetic sensing element 12 and the second magnetic sensing element 13 may generate the voltage signals with respect to the magnetic element 11.

The processing element 14 is electrically connected with the first magnetic sensing element 12 and the second magnetic sensing element 13. The processing element 14 may include, for example, a sensor integrated circuit, a microcontroller unit (MCU), a microprocessor unit (MPU), a central processing unit (CPU), an application-specific integrated circuit (ASIC), a digital signal processor (DSP), a graphics processing unit (GPU), a field-programmable gate array (FPGA), or a system-on-chip (SoC), etc.

Figure 3:
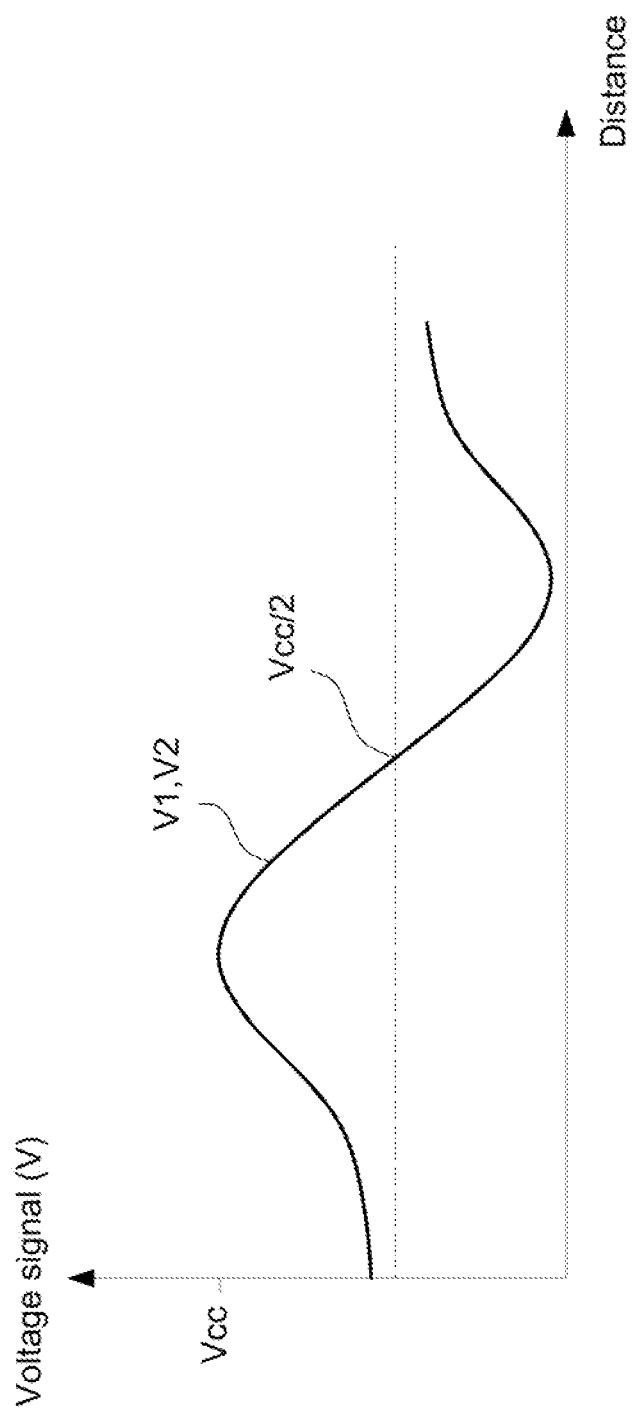
FIG. 3 is a schematic diagram of the relation between the relative position (of the magnetic sensing element and the magnetic element) and the voltage signal.

FIG. 3 is a schematic diagram of the relation between the relative position (of the magnetic sensing element and the magnetic element) and the voltage signal. Referring to FIG. 2 and FIG. 3, in some embodiments, when the first magnetic sensing element 12 or the second magnetic sensing element 13 is located at different positions relative to the magnetic element 11, the voltage signal V1, V2 being generated is shown as FIG. 3. Specifically, when the direction M1 of the magnetic moment of the magnetic element 11 is toward left side (that is, north pole N is on the left side) and the magnetic element 11 moves from left side to right side in FIG. 3, the voltage signal V1, V2 generated by the first magnetic sensing element 12 or the second magnetic sensing element 13 goes upward, and then the voltage signal V1, V2 reaches a topmost point when the magnetic element 11 arrives a specific location. When the magnetic element 11 keeps moving toward right side, the voltage signal V1, V2 goes downward. When the central line (in the direction perpendicular to the moving direction D) of the magnetic element 11 is overlapped with the central line of the first magnetic sensing element 12 or the second magnetic sensing element 13 (as shown in FIG. 2), the magnetic field line of the magnetic element 11 is parallel with the first magnetic sensing element 12 or the second magnetic sensing element 13, thereby no magnetic field line being detected by the first magnetic sensing element 12 or the second magnetic sensing element 13. Therefore, the voltage signal V1, V2 generated by the first magnetic sensing element 12 or the second magnetic sensing element 13 at the position is the predetermined voltage signal. In some embodiments, the predetermined voltage signal is, for example, half of the supply voltage Vcc (that is, Vcc/2, for example, 1.65V). When the magnetic element 11 keeps moving toward right side, and the voltage signal V1, V2 generated by the first magnetic sensing element 12 or the second magnetic sensing element 13 reaches a bottommost point when the magnetic element 11 arrives a specific location. When the magnetic element 11 keeps moving toward right side, the voltage signal V1, V2 generated by the first magnetic sensing element 12 or the second magnetic sensing element 13 gradually goes upward and approaches the predetermined voltage signal (for example, Vcc/2, such as 1.65V).

In other words, when the voltage signal V1, V2 is higher than the predetermined voltage signal (for example, Vcc/2), the magnetic element 11 is located at the left side of the first magnetic sensing element 12 or the second magnetic sensing element 13. When the voltage signal V1, V2 is lower than the predetermined voltage signal, the magnetic element 11 is located at the right side of the first magnetic sensing element 12 or the second magnetic sensing element 13.

It should be noted that, when the direction of the magnetic moment M1 of the magnetic element 11 is opposite to the aforementioned direction (that is, north pole N is on the right side), the determining manner of the voltage signal V1, V2 with respect to the predetermined voltage signal is also opposite to the aforementioned determining manner.

Figure 4:
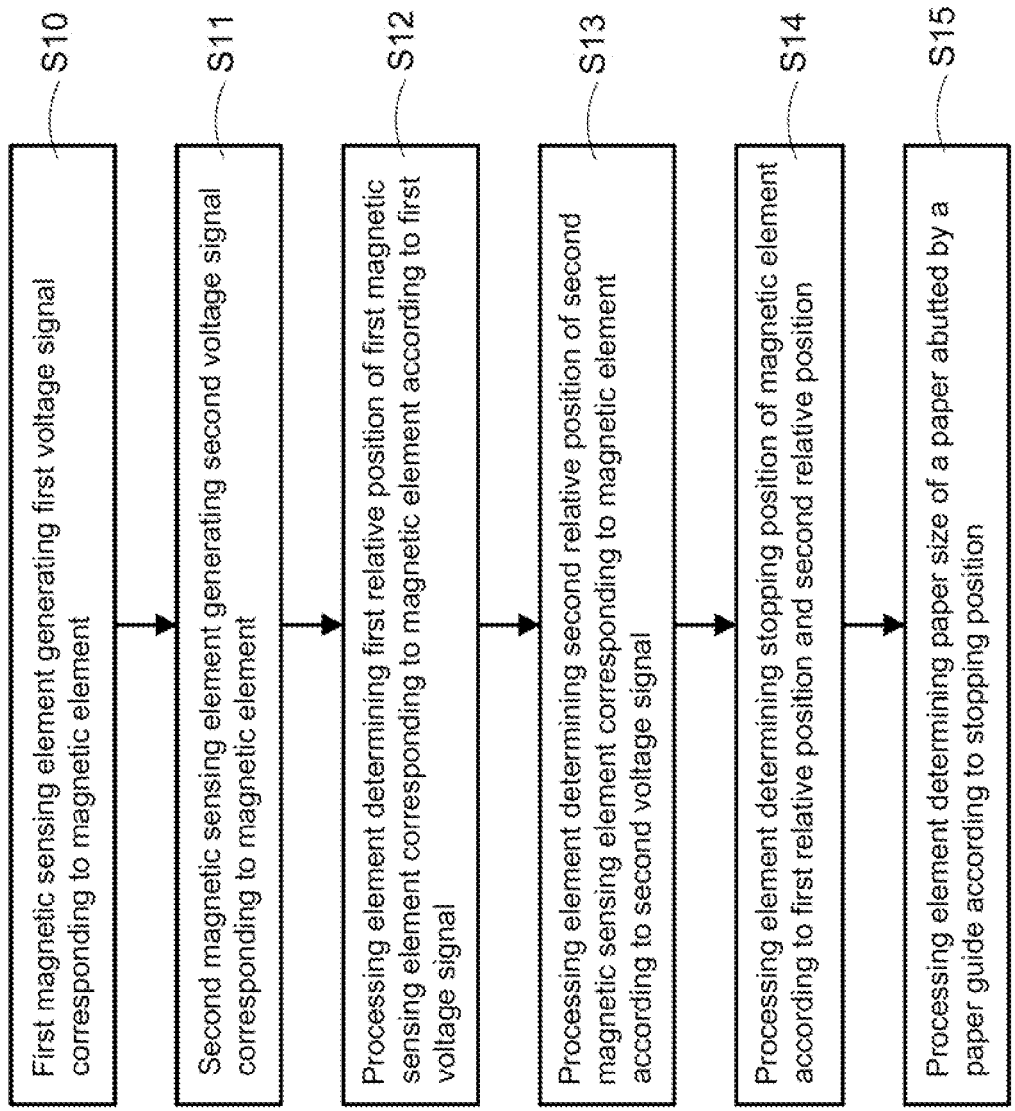
FIG. 4 is a flowchart of a detection method of the sheet detection device, in accordance with the disclosure.

FIG. 4 is a flowchart of a detection method of the sheet detection device, in accordance with the disclosure.

Referring to FIG. 2 and FIG. 4, the detection method of the sheet detection device in the disclosure includes the step S10 to the step S15. In the step S10, the first magnetic sensing element 12 generates a first voltage signal V1 corresponding to the magnetic element 11. In the step S11, the second magnetic sensing element 13 generates a second voltage signal V2 corresponding to the magnetic element 11. In the step S12, the processing element 14 determines a first relative position P1 of the magnetic element 11 relative to the first magnetic sensing element 12 according to the first voltage signal V1. In the step S13, the processing element 14 determines a second relative position P2 of the magnetic element 11 relative to the second magnetic sensing element 13 according to the second voltage signal V2. In the step S14, the processing element 14 determines a stopping position P of the magnetic element 11 according to the first relative position P1 and the second relative position P2. In the step S15, the processing element 14 determines a sheet size of a paper (not shown in figures) abutted by the paper guide 91 according to the stopping position P.

Specifically, for example, when the first voltage signal V1 is corresponding to the predetermined voltage signal (for example, Vcc/2 in FIG. 3, such as 1.65 V), the processing element 14 is configured to determine the first relative position P1 to be that the magnetic element 11 is located at the first magnetic sensing element 12, and determine the second relative position P2 to be that the magnetic element 11 is located at one side of the second magnetic sensing element 13 adjacent to the first magnetic sensing element 12. The processing element 14 is configured to determine the stopping position P to be that the magnetic element 11 is located at the first magnetic sensing element 12 according to the first relative position P1 and the second relative position P2.

It is worth mentioning that the magnetic element 11 being located at the first magnetic sensing element 12 indicates, for example, the magnetic element 11 being adjacent to the first magnetic sensing element 12, the central line (in the direction perpendicular to the moving direction D) of the magnetic element 11 being aligned with the central line of the first magnetic sensing element 12, or the distance between the central line of the magnetic element 11 and the central line of the first magnetic sensing element 12 being the shortest distance, or the other conditions that the magnetic element 11 is adjacent to the first magnetic sensing element 12 and the first voltage signal V1 is generated, here is not intended to be limiting.

Further, the magnetic element 11 being located at one side of the second magnetic sensing element 13 adjacent to the first magnetic sensing element 12 indicates that, for example, as shown in FIG. 2, the magnetic element 11 is located at the right side of the second magnetic sensing element 13. In other words, in the left side and right side of the second magnetic sensing element 13, the magnetic element 11 is located at the side (that is, the right side in FIG. 2) adjacent to the first magnetic sensing element 12.

Thus, when the processing element 14 determines the stopping position P to be that the magnetic element 11 is located at the first magnetic sensing element 12 according to the first relative position P1 and the second relative position P2, the processing element 14 is configured to determine that the sheet size of the paper (not shown in figures) abutted by the paper guide 91 is corresponding to the sheet size defined by the position of the first magnetic sensing element 12.

Figure 5:
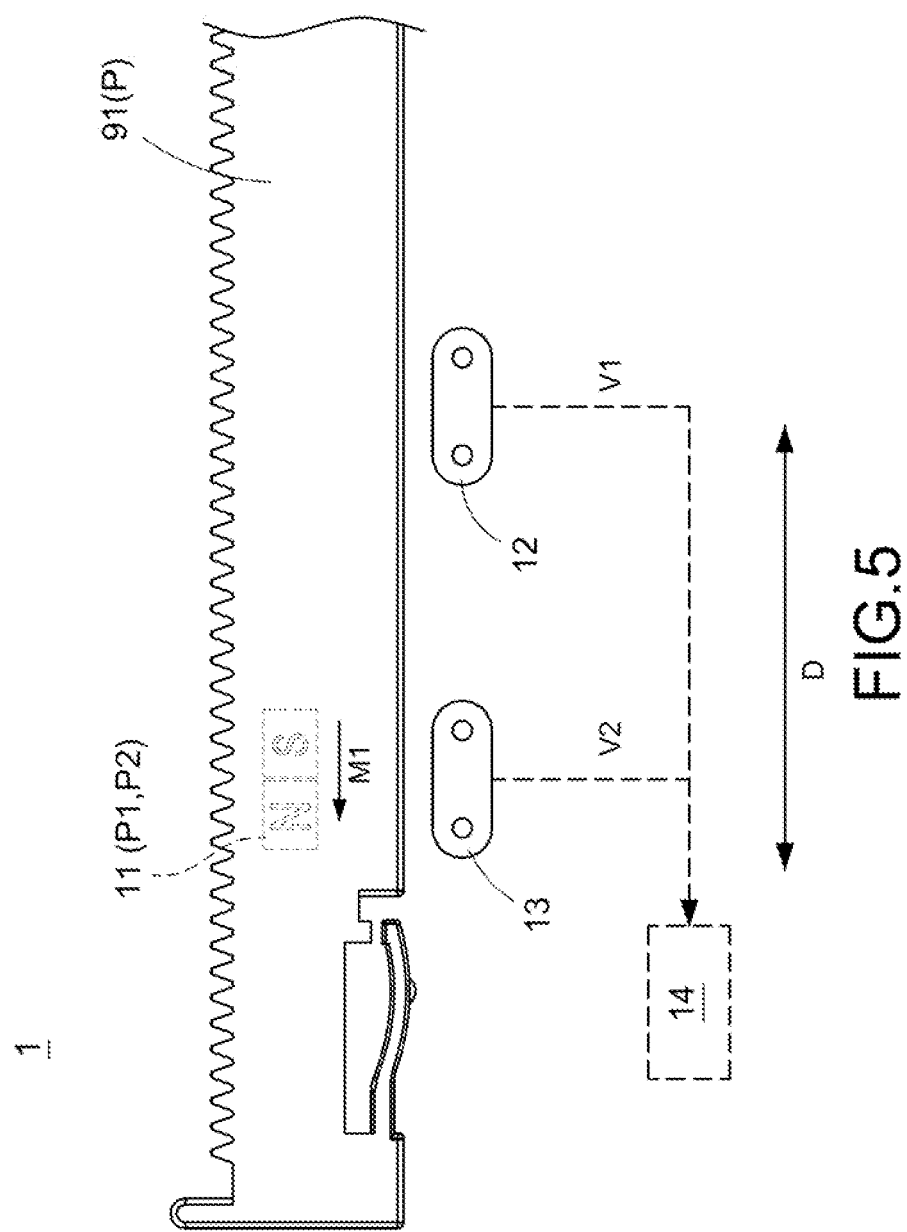
FIG. 5 is a schematic diagram of a using state of the sheet detection device, in accordance with the first embodiment of the disclosure.

FIG. 5 is a schematic diagram of a using state of the sheet detection device, in accordance with the first embodiment of the disclosure.

In some embodiments, when the first voltage signal V1 is not corresponding to the predetermined voltage signal (for example, Vcc/2 in FIG. 3, such as 1.65 V) and the second voltage signal V2 is corresponding to the predetermined voltage, the processing element 14 is configured to determine the first relative position P1 to be that the magnetic element 11 is located at one side of the first magnetic sensing element 12 adjacent to the second magnetic sensing element 13, and determine the second relative position P2 to be that the magnetic element 11 is located at the second magnetic sensing element 13. The processing element 14 is configured to determine the stopping position P to be that the magnetic element 11 is located at the second magnetic sensing element 13 according to the first relative position P1 and the second relative position P2.

It is worth mentioning that the magnetic element 11 being located at one side of the first magnetic sensing element 12 adjacent to the second magnetic sensing element 13 indicates, for example, as shown in FIG. 5, the magnetic element 11 being located at the left side of the first magnetic sensing element 12. In other words, in the left side and right side of the first magnetic sensing element 12, the magnetic element 11 is located at the side (that is, the left side in FIG. 5) adjacent to the second magnetic sensing element 13.

Further, the magnetic element 11 being located at the second magnetic sensing element 13 indicates that, for example, the magnetic element 11 is adjacent to the second magnetic sensing element 13, the central line (in the direction perpendicular to the moving direction D) of the magnetic element 11 is aligned with the central line of the second magnetic sensing element 13, or the distance between the central line of the magnetic element 11 and the central line of the second magnetic sensing element 13 is the shortest distance, or the other conditions that the magnetic element 11 is adjacent to the second magnetic sensing element 13 and the second voltage signal V2 is generated, here is not intended to be limiting.

Thus, when the processing element 14 determines the stopping position P to be that the magnetic element 11 is located at the second magnetic sensing element 13 according to the first relative position P1 and the second relative position P2, the processing element 14 is configured to determine that the sheet size of the paper (not shown in figures) abutted by the paper guide 91 is corresponding to the sheet size defined by the position of the second magnetic sensing element 13.

Figure 6:
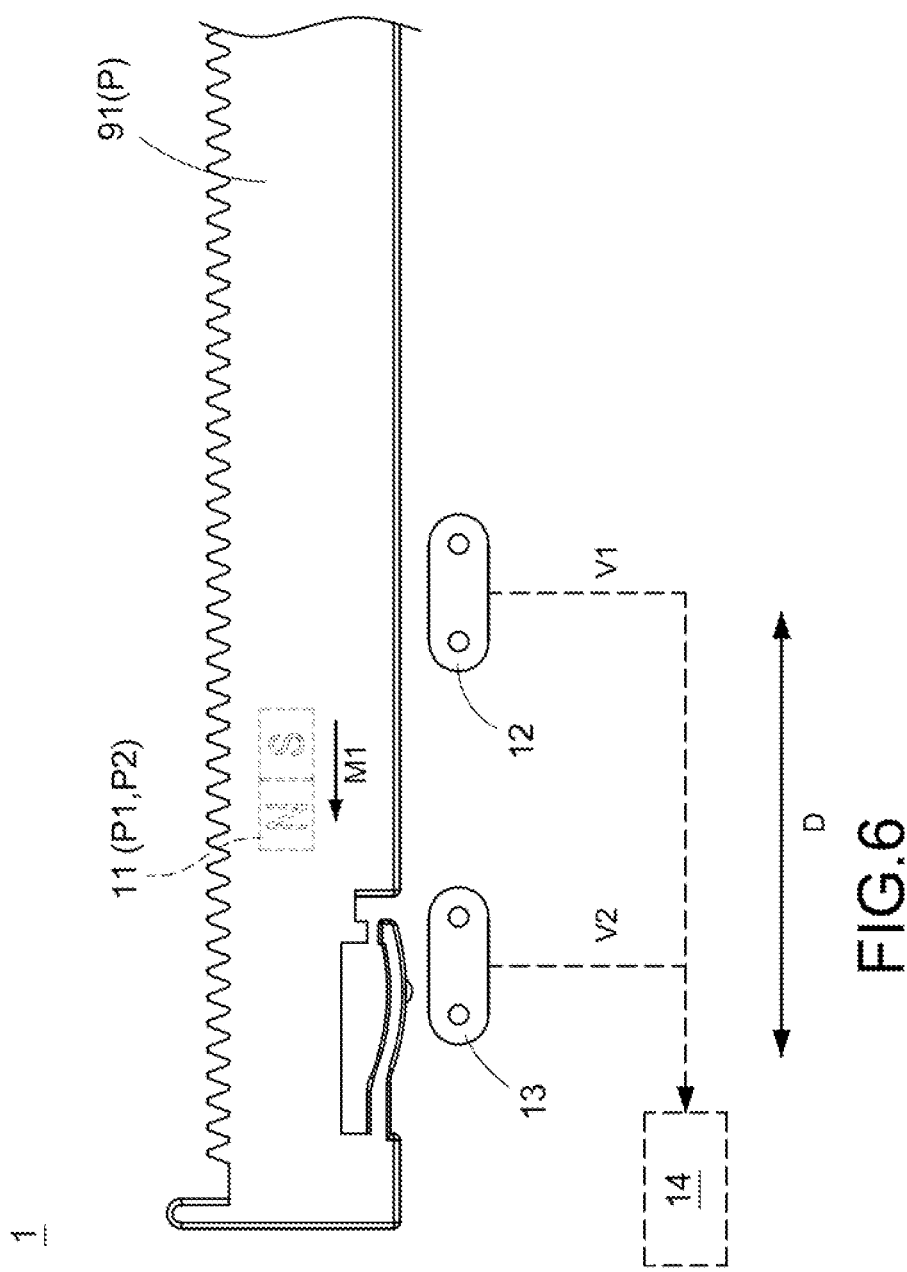
FIG. 6 is a schematic diagram of a using state of the sheet detection device, in accordance with the first embodiment of the disclosure.

FIG. 6 is a schematic diagram of a using state of the sheet detection device, in accordance with the first embodiment of the disclosure.

In some embodiments, when both the first voltage signal V1 and the second voltage signal V2 are not corresponding to the predetermined voltage signal (for example, Vcc/2 in FIG. 3, such as 1.65 V), and the first voltage signal V1 and the second voltage signal V2 are at two sides of the predetermined voltage signal, the processing element 14 is configured to determine the first relative position P1 to be that the magnetic element 11 is located at one side of the first magnetic sensing element 12 adjacent to the second magnetic sensing element 13, and determine the second relative position P2 to be that the magnetic element 11 is located at one side of the second magnetic sensing element 13 adjacent to the first magnetic sensing element 12. The processing element 14 is configured to determine the stopping position P to be that the magnetic element 11 is located between the first magnetic sensing element 12 and the second magnetic sensing element 13 according to the first relative position P1 and the second relative position P2.

It is worth mentioning that the magnetic element 11 being located at one side of the first magnetic sensing element 12 adjacent to the second magnetic sensing element 13 indicates, for example, as shown in FIG. 6, the magnetic element 11 being located at the left side of the first magnetic sensing element 12. In other words, in the left side and right side of the first magnetic sensing element 12, the magnetic element 11 is located at the side (that is, the left side in FIG. 6) adjacent to the second magnetic sensing element 13.

Further, the magnetic element 11 being located at one side of the second magnetic sensing element 13 adjacent to the first magnetic sensing element 12 indicates that, for example, as shown in FIG. 6, the magnetic element 11 is located at the right side of the second magnetic sensing element 13. In other words, in the left side and right side of the second magnetic sensing element 13, the magnetic element 11 is located at the side (that is, the right side in FIG. 6) adjacent to the first magnetic sensing element 12.

Thus, when the processing element 14 determines the stopping position P to be that the magnetic element 11 is located between the first magnetic sensing element 12 and the second magnetic sensing element 13 according to the first relative position P1 and the second relative position P2, the processing element 14 is configured to determine that the sheet size of the paper (not shown in figures) abutted by the paper guide 91 is corresponding to the sheet size defined by the relative position between the magnetic element 11, the first magnetic sensing element 12, and the second magnetic sensing element 13.

In summary, the sheet detection device 1 and the detection method thereof of the embodiment have two magnetic sensing elements 12, 13 disposed at different positions, and the magnetic sensing elements 12, 13 generate different voltage signals V1, V2 corresponding to the magnetic element 11, respectively. Therefore, when the paper guide 91 moves to different positions with the magnetic element 11 and different magnetic sensing elements 12, 13 generate different voltage signals V1, V2 corresponding to the magnetic element 11, the processing element 14 may be configured to determine the relative positions P1, P2 of the magnetic element 11 with respect to the magnetic sensing elements 12, 13 according to the voltage signals V1, V2, and further to precisely determine the position of the paper guide 91 with the magnetic element 11. Comparing to the related art, which is solely structured by detecting "YES" or "NO" signal, in the sheet detection device 1 and the detection method thereof of the embodiment, when the magnetic element 11 is located at any position, the processing element 14 is configured to determine the relative position P1, P2 of the magnetic element 11 according to the voltage signals V1, V2 generated by the magnetic sensing elements 12, 13. As a result, the erroneous signal determination may be avoided, and the size of the sheet abutted by the paper guide 91 may be precisely determined.

Figure 8B:
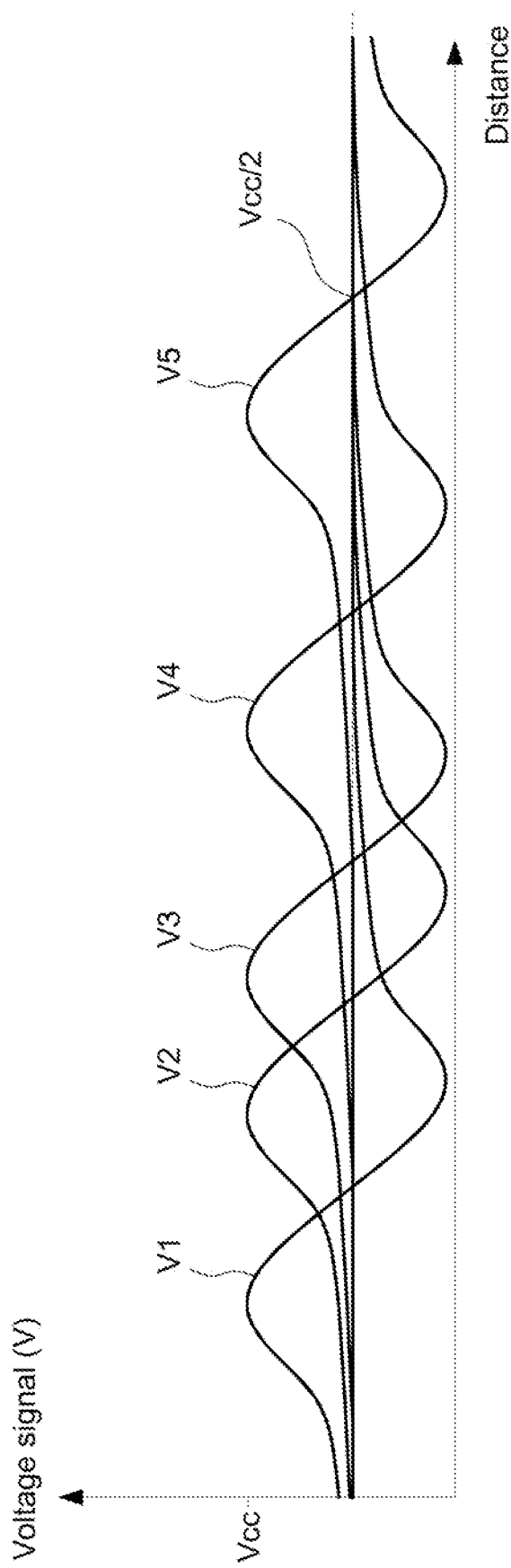
FIG. 8B is a schematic diagram of the relation between the relative position (of the magnetic sensing element and the magnetic element) and the voltage signal.

FIG. 7 is a schematic diagram of a sheet detection device 2 incorporated with a paper tray 9, in accordance with the second embodiment of the disclosure. FIG. 8A is a schematic diagram of a using state of the sheet detection device 2, in accordance with the second embodiment of the disclosure. FIG. 8B is a schematic diagram of the relation between the relative position (of the magnetic sensing elements 22A-22E and the magnetic element 21) and the voltage signal.

Referring to FIG. 7 and FIG. 8A, the difference between the sheet detection device 2 of the embodiment and the aforementioned sheet detection device 1 is that the paper guide 91 is left side and right side linked paper guide, and the sheet detection device 2 includes the magnetic sensing elements 22A, 22B, 22C, 22D, 22E in the number corresponding to the number of the predetermined sheet type. In the embodiment, the sheet detection device 2 including five magnetic sensing elements 22A, 22B, 22C, 22D, 22E corresponding to the sheet size of A3, B4, Letter, A4, A5 is used as an example, here is not intended to be limiting.

It should be noted that the magnetic sensing elements 22A, 22B, 22C, 22D, 22E are corresponding to different sheet sizes, and the spacings between any adjacent two of the magnetic sensing elements 22A, 22B, 22C, 22D, 22E are all different. For example, the spacing D1 is between the magnetic sensing element 22A and the magnetic sensing element 22B, the spacing D2 is between the magnetic sensing element 22B and the magnetic sensing element 22C, the spacing D3 is between the magnetic sensing element 22C and the magnetic sensing element 22D, the spacing D4 is between the magnetic sensing element 22D and the magnetic sensing element 22E, and the spacings D1-D4 are different from one another.

Further, in the embodiment, one magnetic element 21 is used as an example, here is not intended to be limiting. Two or more than two magnetic elements may be disposed depending on different design. The arrangement of the direction M1 of the magnetic moment (the direction from south pole S to north pole N of the magnet) is the same with the moving direction D of the paper guide 91 away from the side wall of the paper tray 9 (that is, the moving direction D toward left in FIG. 8A) as an example.

The magnetic sensing element 22A is disposed on the paper tray 9 and corresponding to the sheet size of A5. The magnetic sensing element 22B is disposed on the paper tray 9 and corresponding to the sheet size of A4. The magnetic sensing element 22C is disposed on the paper tray 9 and corresponding to the sheet size of Letter. The magnetic sensing element 22D is disposed on the paper tray 9 and corresponding to the sheet size of B4. The magnetic sensing element 22E is disposed on the paper tray 9 and corresponding to the sheet size of A3.

Referring to FIG. 8A and FIG. 8B, in some embodiments, the magnetic element 21 may be, for example, magnet. The table 1 below shows, for example, one embodiment of the look-up table of the voltage signals V1, V2, V3, V4, V5 generated by the magnetic sensing elements 22A, 22B, 22C, 22D, 22E, when the magnetic element 21 respectively moves to be located at the magnetic sensing elements 22A, 22B, 22C, 22D, 22E, here is not intended to be limiting. The values may be different with different element specifications.

TABLE 1

|  |  | Voltage signal(V) | | | | |
| --- | --- | --- | --- | --- | --- | --- |
|  |  | V1 | V2 | V3 | V4 | V5 |
| Magnetic element's position | 22A | 1.65 | 3 | 1.8 | 1.65 | 1.65 |
|  | 22B | 0.5 | 1.65 | 3.2 | 1.65 | 1.65 |
|  | 22C | 1.5 | 0.2 | 1.65 | 1.8 | 1.65 |
|  | 22D | 1.65 | 1.65 | 1.4 | 1.65 | 2 |
|  | 22E | 1.65 | 1.65 | 1.65 | 1.2 | 1.65 |

Therefore, when the user moves the paper guide 91 along the moving direction D in the paper tray 9 to abut against the paper, the magnetic element 21 moves with the paper guide 91. For example, when the magnetic sensing element 22A outputs the voltage signal V1 (for example, 0.5V in table 1) corresponding to the magnetic element 21, the magnetic sensing element 22B outputs the voltage signal V2 (for example, 1.65V in table 1) corresponding to the magnetic element 21, and the magnetic sensing element 22C outputs the voltage signal V3 (for example, 3.2V in table 1) corresponding to the magnetic element 21, the processing element 14 is configured to determine that the magnetic element 21 is located at the right side of the magnetic sensing element 22A (as shown in FIG. 8A, that is, the side of the magnetic sensing element 22A adjacent to the magnetic sensing element 22B) based on the voltage signal V1 smaller than the predetermined voltage signal (for example, Vcc/2, such as 1.65V), determine that the magnetic element 21 is located at the magnetic sensing element 22B based on the voltage signal V2 equal to the predetermined voltage signal, and determine that the magnetic element 21 is located at the left side of the magnetic sensing element 22C (as shown in FIG. 8A, that is, the side of the magnetic sensing element 22C adjacent to the magnetic sensing element 22B) based on the voltage signal V3 greater than the predetermined voltage signal. As a result, the processing element 24 is configured to determine the stopping position P to be that the magnetic element 21 is located at the magnetic sensing element 22B according to the relative positions of the magnetic element 21 relative to the magnetic sensing element 22A-22C.

It should be noted that the voltage signals V4, V5 of the magnetic sensing element 22D, 22E are also equal to the predetermined voltage signal (for example, Vcc/2, such as 1.65V), but the processing element 24 is configured to determine that the magnetic element 21 is located at the left side of the magnetic sensing element 22C based on the voltage signal V3, thereby the processing element 24 determining that the magnetic element 21 is not located at the magnetic sensing element 22D, 22E.

It is worth mentioning that the magnetic element 21 being located at the magnetic sensing element 22B indicates, for example, the magnetic element 21 being adjacent to the magnetic sensing element 22B, the central line (in the direction perpendicular to the moving direction D) of the magnetic element 21 being aligned with the central line of the magnetic sensing element 22B, or the distance between the central line of the magnetic element 21 and the central line of the magnetic sensing element 22B being the shortest distance, or the other conditions that the magnetic element 21 is adjacent to the magnetic sensing element 22B and the voltage signal V2 is generated, here is not intended to be limiting.

Therefore, when the processing element 24 determines the stopping position P to be that the magnetic element 21 is located at the magnetic sensing element 22B according to the relative positions of the magnetic element 21, the processing element 24 is configured to determine that the sheet size of the paper (not shown in figures) abutted by the paper guide 91 is corresponding to the sheet size defined by the position of the magnetic sensing element 22B (for example, the sheet size of A4).

Specifically, the processing element 24 may determine the relative positions of the magnetic element 21 according to table 1, and further determine the stopping position P of the magnetic element 21. The determination results may be organized as table 2 below. In other words, the processing element 24 may be configured to determine that the magnetic element 21 is located at one side of the magnetic sensing elements 22A, 22B, 22C, 22D, 22E, determine the position of the magnetic element 21 by union of sets, and determine the sheet size of the paper abutted by the paper guide 91.

TABLE 2

| | | Position determination | | | | |
|---|---|---|---|---|---|---|
| | | V1 | V2 | V3 | V4 | V5 |
| Magnetic element's position | 22A | X | Left side | Right side | X | X |
| | 22B | Right side | X | Left side | X | X |
| | 22C | Right side | Right side | X | Left side | X |
| | 22D | X | X | Right side | X | Left side |
| | 22E | X | X | X | Right side | X |

It should be noted that the aforementioned left side or right side is corresponding to the direction toward left or right of the moving direction D in FIG. 8A.

In summary, the sheet detection device 2 and the detection method thereof of the embodiment are using the magnetic sensing elements 22A-22E of the number corresponding to the predetermined sheet type disposed at different positions, and the magnetic sensing elements 22A-22E generate different voltage signals V1-V5 corresponding to the magnetic element 21, respectively. Therefore, when the paper guide 91 moves to different positions with the magnetic element 21 and different magnetic sensing elements 22A-22E generate different voltage signals V1-V5 corresponding to the magnetic element 21, the processing element 24 may be configured to determine the relative positions of the magnetic element 21 with respect to the magnetic sensing elements 22A-22E according to the voltage signals V1-V5, and further to precisely determine the position of the paper guide 91 with the magnetic element 21. Comparing to the related art, which is solely structured by detecting "YES" or "NO" signal, in the sheet detection device 2 and the detection method thereof of the embodiment, when the magnetic element 21 is located at any position, the processing element 24 is configured to determine the relative positions of the magnetic element 21 according to the voltage signals V1-V5 generated by the magnetic sensing elements 22A-22E. As a result, the erroneous signal determination may be avoided, and the size of the sheet abutted by the paper guide 91 may be precisely determined.

Figure 9B:
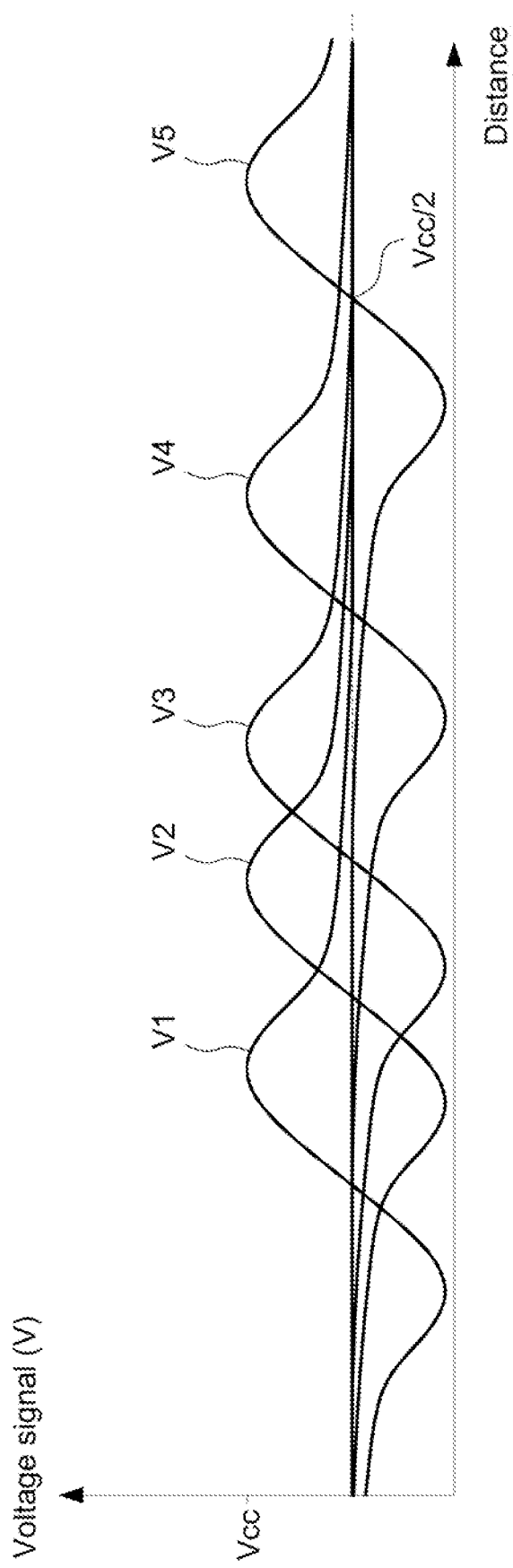
FIG. 9B is a schematic diagram of the relation between the relative position (of the magnetic sensing element and the magnetic element) and the voltage signal.

FIG. 9A is a schematic diagram of a using state of the sheet detection device 3, in accordance with the third embodiment of the disclosure. FIG. 9B is a schematic diagram of the relation between the relative position (of the magnetic sensing elements 32A-32E and the magnetic element 31) and the voltage signal.

Referring to FIG. 9A and FIG. 9B, the difference between the sheet detection device 3 of the embodiment and the aforementioned sheet detection device 2 is that the direction M2 of the magnetic moment (the direction from south pole S to north pole N of the magnet) of the magnetic element 31 is the same with the moving direction D of the paper guide 91 close to the side wall of the paper tray 9 (that is, the moving direction D toward right in FIG. 9A)

The arrangement of the magnetic sensing element 32A, 32B, 32C, 32D, 32E are similar to the arrangement of the magnetic sensing element 22A, 22B, 22C, 22D, 22E, here is omitted for brevity.

In some embodiments, the table 3 below shows, for example, one embodiment of the look-up table of the voltage signals V1, V2, V3, V4, V5 generated by the magnetic sensing elements 32A, 32B, 32C, 32D, 32E, when the magnetic element 31 respectively moves to be located at the magnetic sensing elements 32A, 32B, 32C, 32D, 32E, here is not intended to be limiting. The values may be different with different element specifications.

TABLE 3

| | | Voltage signal(V) | | | | |
|---|---|---|---|---|---|---|
| | | V1 | V2 | V3 | V4 | V5 |
| Magnetic element's position | 32A | 1.65 | 0.5 | 1.5 | 1.65 | 1.65 |
| | 32B | 3 | 1.65 | 0.2 | 1.65 | 1.65 |
| | 32C | 1.8 | 3.2 | 1.65 | 1.4 | 1.65 |
| | 32D | 1.65 | 1.65 | 1.8 | 1.65 | 1.2 |
| | 32E | 1.65 | 1.65 | 1.65 | 2 | 1.65 |

In other words, when the direction M2 of the magnetic moment of the magnetic element 31 is opposite to the direction M1 of the magnetic moment (as shown in FIG. 8A), the determining manner of the voltage signal V1-V5 with respect to the predetermined voltage signal is also opposite to the determining manner in the second embodiment.

Therefore, when the user moves the paper guide 91 along the moving direction D in the paper tray 9 to abut against the paper, the magnetic element 31 moves with the paper guide 91. For example, when the magnetic sensing element 32A outputs the voltage signal V1 (for example, 3V in table 3) corresponding to the magnetic element 31, the magnetic sensing element 32B outputs the voltage signal V2 (for example, 1.65V in table 3) corresponding to the magnetic element 31, and the magnetic sensing element 32C outputs the voltage signal V3 (for example, 0.2V in table 3) corresponding to the magnetic element 31, the processing element 34 is configured to determine that the magnetic element 31 is located at the right side of the magnetic sensing element 32A (as shown in FIG. 9A, that is, the side of the magnetic sensing element 32A adjacent to the magnetic sensing element 32B) based on the voltage signal V1 greater than the predetermined voltage signal (for example, Vcc/2, such as 1.65V), determine that the magnetic element 31 is located at the magnetic sensing element 32B based on the voltage signal V2 equal to the predetermined voltage signal, and determine that the magnetic element 31 is located at the left side of the magnetic sensing element 32C (as shown in FIG. 9A, that is, the side of the magnetic sensing element 32C adjacent to the magnetic sensing element 32B) based on the voltage signal V3 greater than the predetermined voltage signal. As a result, the processing element 34 is configured to determine the stopping position P to be that the magnetic element 31 is located at the magnetic sensing element 32B according to the relative positions of the magnetic element 31 relative to the magnetic sensing element 32A-32C.

Similarly, the voltage signals V4, V5 of the magnetic sensing element 32D, 32E are also equal to the predetermined voltage signal (for example, Vcc/2, such as 1.65V), but the processing element 34 is configured to determine that the magnetic element 31 is located at the left side of the magnetic sensing element 32C based on the voltage signal V3, thereby the processing element 34 determining that the magnetic element 31 is not located at the magnetic sensing element 32D, 32E.

Therefore, when the processing element 34 determines the stopping position P to be that the magnetic element 31 is located at the magnetic sensing element 32B according to the relative positions of the magnetic element 31, the processing element 34 is configured to determine that the sheet size of the paper (not shown in figures) abutted by the paper guide 91 is corresponding to the sheet size defined by the position of the magnetic sensing element 32B (for example, the sheet size of A4).

Specifically, similar to the description in the second embodiment, the processing element 34 may determine the relative positions of the magnetic element 31 according to table 3, and further determine the stopping position P of the magnetic element 31. The determination results may be organized as table 2. In other words, the processing element 34 may be configured to determine that the magnetic element 31 is located at one side of the magnetic sensing elements 32A, 32B, 32C, 32D, 32E, determine the position of the magnetic element 31 by union of sets, and determine the sheet size of the paper abutted by the paper guide 91.

In summary, in the sheet detection device 3 and the detection method thereof of the embodiment, when the magnetic element 31 is located at any position, the processing element 34 is configured to determine the relative positions of the magnetic element 31 according to the voltage signals V1-V5 generated by the magnetic sensing elements 32A-32E. As a result, the erroneous signal determination may be avoided, and the size of the sheet abutted by the paper guide 91 may be precisely determined. Further, the design freedom of the sheet detection device 3 and the detection method thereof may be increased by the different arrangement in the direction of the magnetic moment of the magnetic element 31.

Figure 10A:
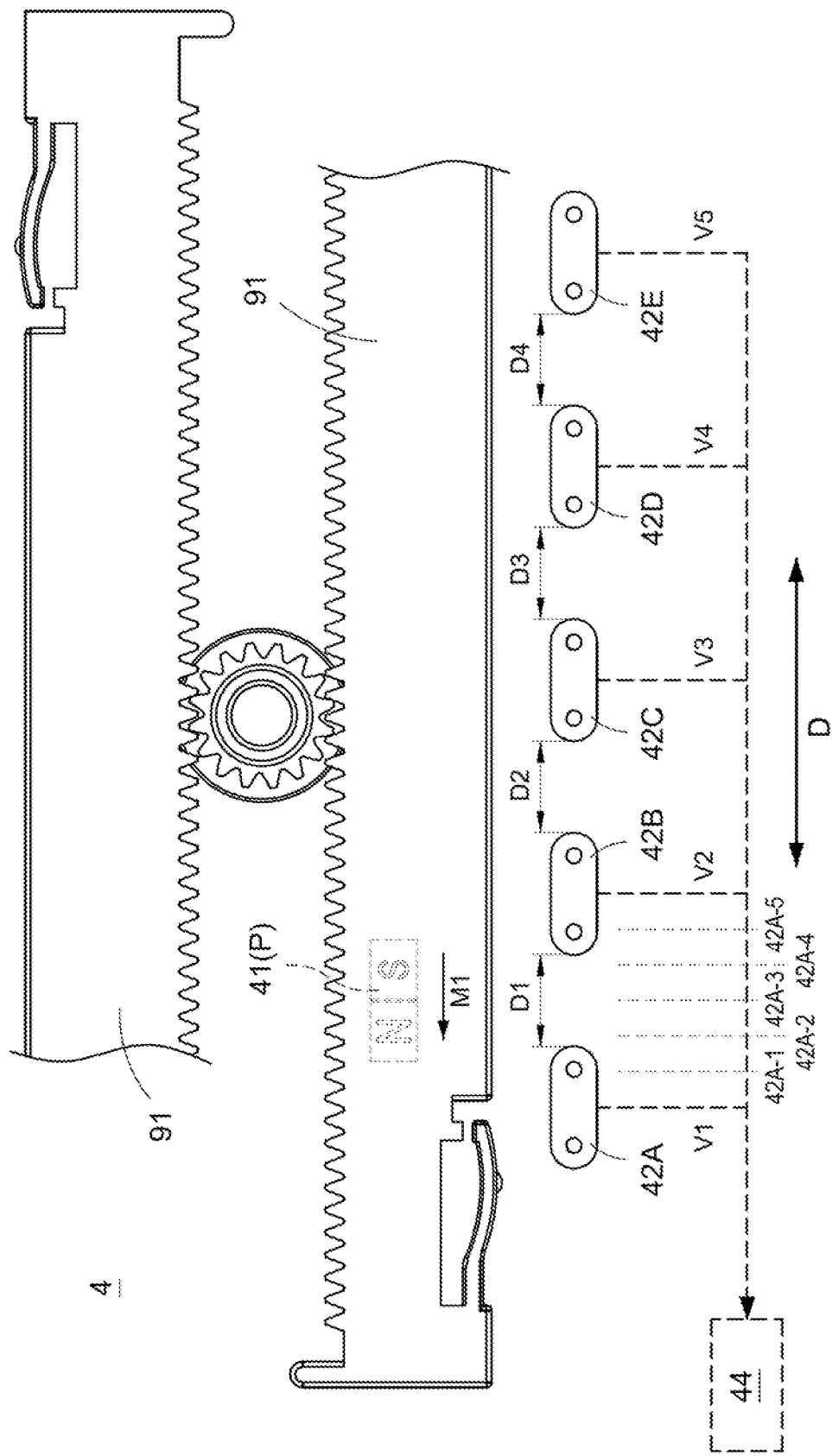
FIG. 10A is a schematic diagram of a using state of the sheet detection device, in accordance with the fourth embodiment of the disclosure.
Figure 10B:
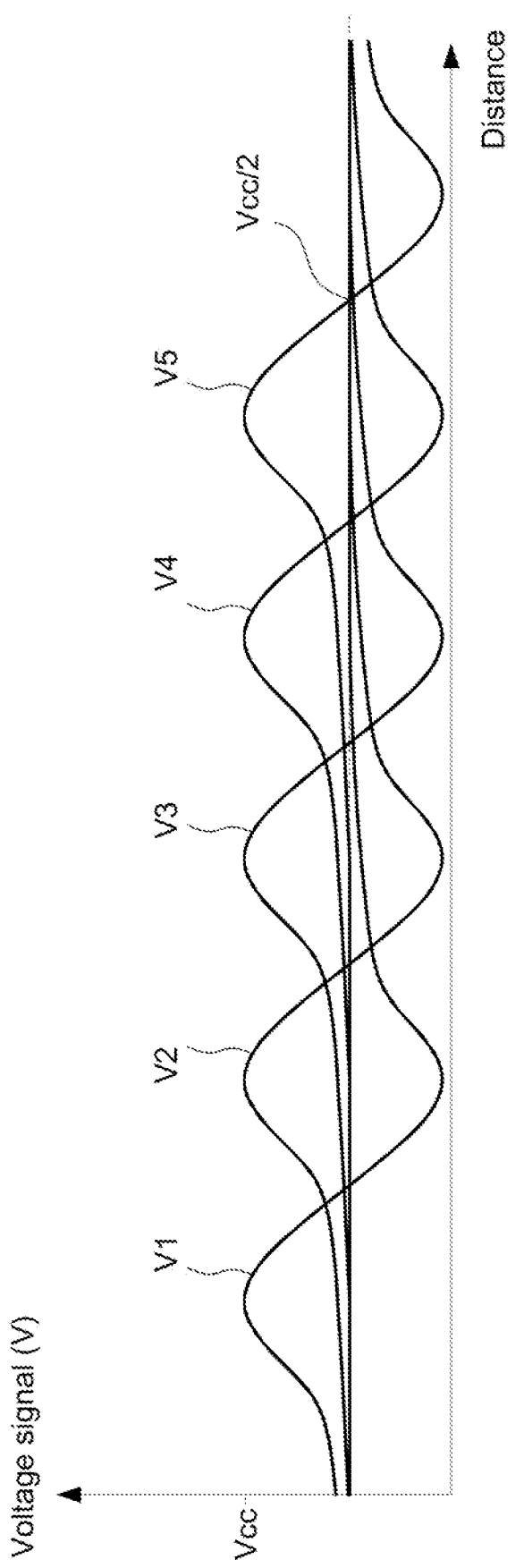
FIG. 10B is a schematic diagram of the relation between the relative position (of the magnetic sensing element and the magnetic element) and the voltage signal.

FIG. 10A is a schematic diagram of a using state of the sheet detection device 4, in accordance with the fourth embodiment of the disclosure. FIG. 10B is a schematic diagram of the relation between the relative position (of the magnetic sensing elements 42A-42E and the magnetic element 41) and the voltage signal.

Referring to FIG. 10A and FIG. 10B, the difference between the sheet detection device 4 of the embodiment and the aforementioned sheet detection device 2 is that the spacings between any adjacent two of the magnetic sensing elements 42A, 42B, 42C, 42D, 42E are all the same. For example, the spacing D1 is between the magnetic sensing element 42A and the magnetic sensing element 42B, the spacing D2 is between the magnetic sensing element 42B and the magnetic sensing element 42C, the spacing D3 is between the magnetic sensing element 42C and the magnetic sensing element 42D, the spacing D4 is between the magnetic sensing element 42D and the magnetic sensing element 42E, and the spacings D1-D4 are all the same. In the embodiment, the sheet detection device 4 including five magnetic sensing elements 42A, 42B, 42C, 42D, 42E is used as an example, here is not intended to be limiting. Two or more than two magnetic sensing elements may be disposed depending on different design. Moreover, the distance of the spacings D1-D4 is not limiting, here uses 10 mm as an example.

The arrangement of the direction M1 of the magnetic moment of the magnetic element 41 is using that the direction M1 of the magnetic moment is the same with the moving direction D of the paper guide 91 away from the side wall of the paper tray 9 (that is, the moving direction D toward left in FIG. 10A) as an example.

In some embodiments, the table 4 below shows, for example, one embodiment of the look-up table of the voltage signals V1-V5 generated by the magnetic sensing elements 42A-42E, when the magnetic element 41 is distanced differently with respect to the magnetic sensing elements 42A-42E, here is not intended to be limiting. The values may be different with different element specifications. It should be noted that negative distance indicates that the magnetic element 41 is located at left side of the magnetic sensing elements 42A-42E (the moving direction D toward left in FIG. 10A), and positive distance indicates that the magnetic element 41 is located at right side of the magnetic sensing elements 42A-42E (the moving direction D toward right in FIG. 10A).

TABLE 4

| Distance of magnetic element (mm) | Voltage signal (V) |
| --- | --- |
| −20.00 | 1.65 |
| −19.38 | 1.65 |
| −18.75 | 1.66 |
| −18.13 | 1.66 |
| −17.50 | 1.67 |
| −16.88 | 1.68 |
| −16.25 | 1.71 |
| −15.63 | 1.74 |
| −15.00 | 1.79 |
| −14.38 | 1.83 |
| −13.75 | 1.88 |
| −13.13 | 1.97 |
| −12.50 | 2.02 |
| −11.88 | 2.11 |
| −11.25 | 2.18 |
| −10.63 | 2.27 |
| −10.00 | 2.37 |
| −9.38 | 2.46 |
| −8.75 | 2.60 |
| −8.13 | 2.74 |
| −7.50 | 2.94 |
| −6.88 | 3.09 |
| −6.25 | 3.16 |
| −5.63 | 3.15 |
| −5.00 | 3.09 |
| −4.38 | 3.03 |
| −3.75 | 2.89 |
| −3.13 | 2.72 |
| −2.50 | 2.57 |
| −1.88 | 2.34 |
| −1.25 | 2.14 |
| −0.63 | 1.94 |
| 0.63 | 1.48 |
| 1.25 | 1.25 |
| 1.88 | 1.02 |
| 2.50 | 0.82 |
| 3.13 | 0.64 |
| 3.75 | 0.50 |
| 4.38 | 0.36 |
| 5.00 | 0.26 |
| 5.63 | 0.16 |
| 6.25 | 0.14 |
| 6.88 | 0.16 |
| 7.50 | 0.26 |
| 8.13 | 0.39 |
| 8.75 | 0.53 |
| 9.38 | 0.71 |
| 10.00 | 0.82 |
| 10.63 | 0.94 |
| 11.25 | 1.04 |
| 11.88 | 1.13 |
| 12.50 | 1.21 |
| 13.13 | 1.31 |
| 13.75 | 1.36 |
| 14.38 | 1.42 |
| 15.00 | 1.49 |
| 15.63 | 1.54 |
| 16.25 | 1.56 |
| 16.88 | 1.59 |
| 17.50 | 1.62 |
| 18.13 | 1.63 |

TABLE 4-continued

| Distance of magnetic element (mm) | Voltage signal (V) |
|---|---|
| 18.75 | 1.64 |
| 19.38 | 1.64 |
| 20.00 | 1.65 |

Therefore, when the user moves the paper guide 91 along the moving direction D in the paper tray 9 to abut against the paper, the magnetic element 21 moves with the paper guide 91. Hereafter uses that the magnetic element 41 is located between the magnetic sensing element 42A and the magnetic sensing element 42B as an example to describe the determining manner of the processing element 44. When the magnetic element 41 is located between the magnetic sensing element 42A and the magnetic sensing element 42B, the voltage signals V1-V5 generated by the magnetic sensing elements 42A-42E corresponding to the magnetic element 41 is as, for example, the table 5 below. Here uses six sections (that is, five positioning locations 42A-1-42A-5 are further defined between the magnetic sensing element 42A and the magnetic sensing element 42B) as an example, here is not intended to be limiting. The spacings D1-D4 between the magnetic sensing elements 42A-42E may be divided into different number of sections depending on the requirement. For example, the spacings D1-D4 between the magnetic sensing elements 42A-42E may be further divided into more sections (such as more than five positioning locations) to more precisely determine the position of the magnetic element 41.

TABLE 5

|  |  | Voltage signal(V) | | | | |
|---|---|---|---|---|---|---|
|  |  | V1 | V2 | V3 | V4 | V5 |
| Magnetic element's position | 42A | 1.65 | 2.4 | 1.65 | 1.65 | 1.65 |
|  | 42A-1 | 1.1 | 2.7 | 1.7 | 1.65 | 1.65 |
|  | 42A-2 | 0.6 | 3.1 | 1.7 | 1.65 | 1.65 |
|  | 42A-3 | 0.3 | 3.1 | 1.8 | 1.65 | 1.65 |
|  | 42A-4 | 0.2 | 2.7 | 2 | 1.65 | 1.65 |
|  | 42A-5 | 0.4 | 2.2 | 2.2 | 1.65 | 1.65 |

For example, when the magnetic element 41 is located at the location 42A-3, the magnetic sensing element 42 outputs the voltage signal V1 as 0.3V corresponding to the magnetic element 41, the magnetic sensing element 42B outputs the voltage signal V2 as 3.1V corresponding to the magnetic element 41, the processing element 44 is configured to determine that the magnetic element 41 is located at the right side of the magnetic sensing element 42A (as shown in FIG. 10A, that is, the side of the magnetic sensing element 42A adjacent to the magnetic sensing element 42B) based on the voltage signal V1 smaller than the predetermined voltage signal (for example, Vcc/2, such as 1.65V), determine that the magnetic element 41 is located at the left side of the magnetic sensing element 42B (as shown in FIG. 10A, that is, the side of the magnetic sensing element 42B adjacent to the magnetic sensing element 42A) based on the voltage signal V2 greater than the predetermined voltage signal.

Further, the processing element 44 is configured to determine that the magnetic element 41 is approximately located at 5 mm from the right side (table 4 indicates that 5 mm is corresponding to 0.26V) of the magnetic sensing element 42A based on the voltage signal V1 being 0.3V, and determine that the magnetic element 41 is approximately located at 5 mm from the left side (table 4 indicates that −5 mm is corresponding to 3.09V) or 6.88 mm from the left side (table 4 indicates that −6.88 mm is also corresponding to 3.09V) of the magnetic sensing element 42B based on the voltage signal V2 being 3.1V. As a result, the processing element 44 is configured to determine the stopping position P to be that the magnetic element 41 is located at 5 mm from the right side of the magnetic sensing element 42A and 5 mm from the left side of the magnetic sensing element 42B (that is, the location 42A-3) through logic comparison.

Therefore, when the processing element 44 determines the distances of the stopping position P of the magnetic element 41 relative to different magnetic sensing elements 42A-42E according to the voltage signals V1-V5 generated by the magnetic sensing elements 42A-42E, the processing element 44 may determine the location of the paper guide 91, and determine the sheet size of the paper being abutted according to the distance configuration.

As described above, the sheet detection device 4 and the detection method thereof of the embodiment may not need to have the number of the magnetic sensing elements corresponding to the number of the predetermined sheet type, and have a smaller number of magnetic sensing elements instead. By different magnetic sensing elements generating different voltage signals corresponding to the magnetic element 41, the processing element 44 may be configured to determine the relative positions of the magnetic element 41 relative to the magnetic sensing elements according to the voltage signals to precisely determine the location of the paper guide 91 with the magnetic element 21. Moreover, apart from the erroneous signal determination being avoided and the size of the sheet abutted by the paper guide 91 being precisely determined, the total cost may be further decreased.

In summary, the sheet detection device and the detection method thereof of the disclosure have at least two magnetic sensing elements disposed at different positions, and the magnetic sensing elements generate different voltage signals corresponding to the magnetic element, respectively. Therefore, when the paper guide moves to different positions with the magnetic element and different magnetic sensing elements generate different voltage signals corresponding to the magnetic element, the processing element may be configured to determine the relative positions of the magnetic element with respect to the magnetic sensing elements according to the voltage signals, and further to precisely determine the position of the paper guide with the magnetic element. Comparing to the related art, which is solely structured by detecting "YES" or "NO" signal, in the sheet detection device and the detection method thereof of the disclosure, when the magnetic element is located at any position, the processing element is configured to determine the relative position of the magnetic element according to the voltage signals generated by the magnetic sensing elements. As a result, the erroneous signal determination may be avoided, and the size of the sheet abutted by the paper guide may be precisely determined.

Further, the design freedom of the sheet detection device and the detection method thereof may be increased by the different arrangement in the direction of the magnetic moment of the magnetic element. Moreover, the sheet detection device and the detection method thereof of the embodiment may not need to have the number of the magnetic sensing elements corresponding to the number of the predetermined sheet type, and have a smaller number of magnetic sensing elements instead to decrease the total cost.

While this disclosure has been described by means of specific embodiments, numerous modifications and variations may be made thereto by those skilled in the art without departing from the scope and spirit of this disclosure set forth in the claims.

What is claimed is:

1. A sheet detection device, incorporated with a paper tray, the paper tray comprising a paper guide, and the sheet detection device comprising:
   a magnetic element, disposed on the paper guide;
   a first magnetic sensing element, disposed on the paper tray and configured to generate a first voltage signal corresponding to the magnetic element;
   a second magnetic sensing element, disposed on the paper tray, arranged spacedly with the first magnetic sensing element, and configured to generate a second voltage signal corresponding to the magnetic element;
   a processing element, electrically connected with the first magnetic sensing element and the second magnetic sensing element, and configured to receive the first voltage signal and the second voltage signal; and
   a third magnetic sensing element, disposed on the paper tray, arranged spacedly with the second magnetic sensing element, and the second magnetic sensing element located between the first magnetic sensing element and the third magnetic sensing element; and
   wherein a first spacing between the first magnetic sensing element and the second magnetic sensing element is different from a second spacing between the second magnetic sensing element and the third magnetic sensing element,
   wherein the processing element is configured to determine a first relative position of the magnetic element relative to the first magnetic sensing element according to the first voltage signal, and determine a second relative position of the magnetic element relative to the second magnetic sensing element according to the second voltage signal, and
   the processing element is configured to determine a stopping position of the magnetic element according to the first relative position and the second relative position, and determine a sheet size of a paper abutted by the paper guide according to the stopping position.

2. The sheet detection device according to claim 1, wherein when the first voltage signal is corresponding to a predetermined voltage signal, the processing element is configured to determine the first relative position to be that the magnetic element is located at the first magnetic sensing element, and determine the second relative position to be that the magnetic element is located at one side of the second magnetic sensing element adjacent to the first magnetic sensing element, and
   the processing element is configured to determine the stopping position to be that the magnetic element is located at the first magnetic sensing element according to the first relative position and the second relative position.

3. The sheet detection device according to claim 1, wherein the third magnetic sensing element is configured to generate a third voltage signal corresponding to the magnetic element, and
   the processing element is configured to determine a third relative position of the magnetic element relative to the third magnetic sensing element according to the third voltage signal, and determine the stopping position of the magnetic element according to the first relative position, the second relative position, and the third relative position.

4. The sheet detection device according to claim 3, wherein when the second voltage signal is corresponding to a predetermined voltage signal, the processing element is configured to determine the first relative position to be that the magnetic element is located at one side of the first magnetic sensing element adjacent to the second magnetic sensing element, determine the second relative position to be that the magnetic element is located at the second magnetic sensing element, and determine the third relative position to be that the magnetic element is located at one side of the third magnetic sensing element adjacent to the second magnetic sensing element, and
   the processing element is configured to determine the stopping position to be that the magnetic element is located at the second magnetic sensing element.

* * * * *